7419X
No Printed Specification Available
S. Rust,
Wash-Board,
Patented Feb. 9, 1833.
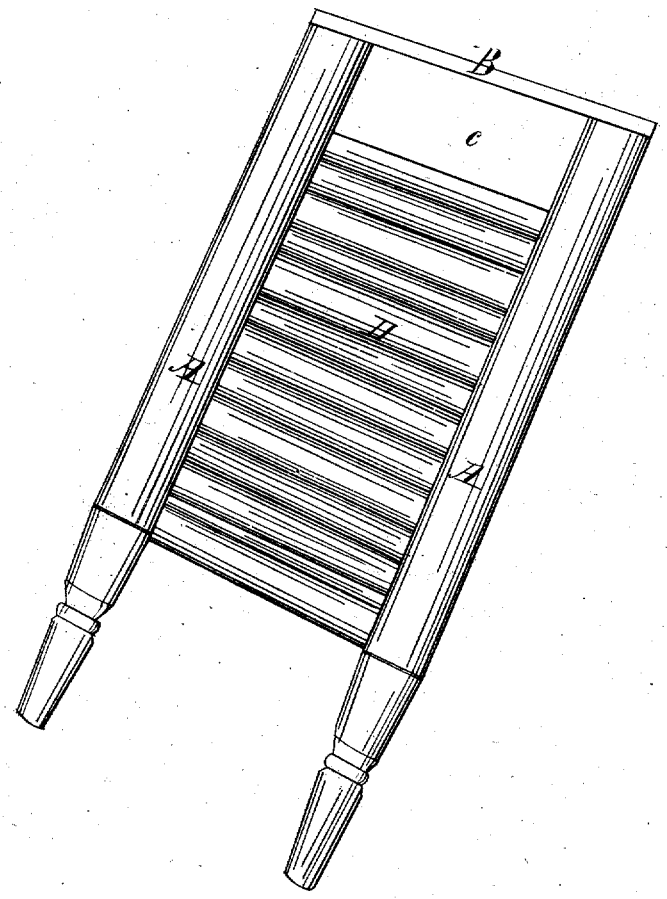
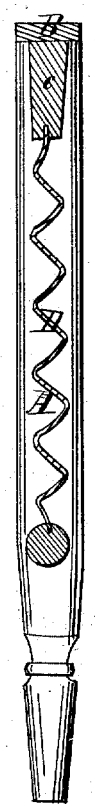
N. PETERS, PHOTO-LITHOGRAPHER, WASHINGTON, D. C.

Stephen Rust of Manlius New York:
Letters Patent.

The Schedule referred to in these Letters Patent and making part of the same containing a description in the words of the said Stephen Rust himself of his improvement in the Wash Board for Washing clothes.

To all to whom these presents shall come. Be it Known that I Stephen Rust of the Town of Manlius in the County of Onondaga and State of New York. have invented a new and useful improvement in making "Wash Boards" and that the following is a full and exact description of the construction of said Machine as invented or improved by me viz. "The side pieces of the frame are made of wood from one inch to three inches wide. and from twenty to thirty inches long and set from six to sixteen inches apart and parallel to each other Between and attached to the side pieces in the upper part of the frame. is inserted a plane board from one to six inches in width and slightly curved downwards. Attached to the board and also to the side pieces. is inserted a piece of fluted tin, sheet iron, copper or zink from ten to twenty inches in length and leaving an open space below and between the side pieces of from four to ten inches. The improvement claimed in this machine is in the use of the fluted tin sheet iron copper or zink" Recd. [illegible]

Witnesses
J G Forbes
David Miller

Stephen Rust.

570 words (252 words) (Patented Feb. 9. 1833)

[illegible]